United States Patent
Mascianica et al.

(10) Patent No.: US 9,819,062 B2
(45) Date of Patent: Nov. 14, 2017

(54) TRACTION BATTERY ASSEMBLY WITH THERMAL DEVICE

(71) Applicant: FORD GLOBAL TECHNOLOGIES, LLC, Dearborn, MI (US)

(72) Inventors: Evan Mascianica, Ann Arbor, MI (US); Jeremy Samborsky, Livonia, MI (US); Josef Dollison, Petersburg, MI (US); Saravanan Paramasivam, South Lyon, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 324 days.

(21) Appl. No.: 14/541,508

(22) Filed: Nov. 14, 2014

(65) Prior Publication Data

US 2016/0141569 A1 May 19, 2016

(51) Int. Cl.
| | |
|---|---|
| H01M 2/10 | (2006.01) |
| H01M 10/625 | (2014.01) |
| H01M 10/6556 | (2014.01) |
| H01M 10/6552 | (2014.01) |
| H01M 10/6554 | (2014.01) |
| H01M 10/647 | (2014.01) |
| H01M 10/613 | (2014.01) |

(52) U.S. Cl.
CPC ....... *H01M 10/625* (2015.04); *H01M 10/613* (2015.04); *H01M 10/647* (2015.04); *H01M 10/6552* (2015.04); *H01M 10/6554* (2015.04); *H01M 10/6556* (2015.04)

(58) Field of Classification Search
CPC .................................................. H01M 10/625
See application file for complete search history.

(56) References Cited

U.S. PATENT DOCUMENTS

| | | | |
|---|---|---|---|
| 5,504,655 | A | 4/1996 | Underwood et al. |
| 6,508,301 | B2 | 1/2003 | Marsala |
| 2008/0316708 | A1 | 12/2008 | Shiao et al. |
| 2011/0020676 | A1* | 1/2011 | Kurosawa ................ B60K 1/04 429/62 |
| 2011/0232864 | A1 | 9/2011 | Zaffetti |
| 2012/0321928 | A1* | 12/2012 | TenHouten ......... B60L 11/1864 429/120 |
| 2013/0330577 | A1* | 12/2013 | Kristofek ............ H01M 2/1077 429/50 |

* cited by examiner

*Primary Examiner* — Stewart Fraser
*Assistant Examiner* — Rachel L Zhang
(74) *Attorney, Agent, or Firm* — David Kelley; Brooks Kushman, P.C.

(57) ABSTRACT

A traction battery includes a first thermal plate disposed within a case, and cells disposed on the first thermal plate. A bracket arrangement is disposed within the case. The bracket arrangement includes a second thermal plate spaced apart from the first thermal plate, and a leg defining at least a portion of a fluid path connecting flow channels of the first and second thermal plates. An electronic component is disposed on the second thermal plate.

20 Claims, 5 Drawing Sheets

TRACTION BATTERY ASSEMBLY WITH THERMAL DEVICE

TECHNICAL FIELD

The present disclosure relates to traction battery assemblies for motor vehicles and specifically to traction battery assemblies having thermal devices.

BACKGROUND

Vehicles such as battery-electric vehicles (BEVs), plug-in hybrid electric vehicles (PHEVs) and full hybrid-electric vehicles (FHEVs) contain a traction battery assembly to act as an energy source for vehicle propulsion. The traction battery includes components and systems to assist in managing vehicle performance and operations. The traction battery also includes high voltage components. Traction batteries may include an air or liquid thermal management system to control the temperature of the battery.

SUMMARY

In one embodiment, a traction battery includes a first thermal plate disposed within a case, and cells disposed on the first thermal plate. A bracket arrangement is disposed within the case. The bracket arrangement includes a second thermal plate spaced apart from the first thermal plate, and a leg defining at least a portion of a fluid path connecting flow channels of the first and second thermal plates. An electronic component is disposed on the second thermal plate.

In another embodiment, a traction battery includes a first thermal plate disposed within a case, cells disposed on the first plate, and a second thermal plate spaced apart from the first plate. The second thermal plate is supported by a bracket that includes a leg between the first and second plates. The leg defines at least a portion of a fluid path connecting flow channels of the first and second thermal plates. An electronic component is disposed against the second thermal plate.

In yet another embodiment, a traction battery includes a case having a thermal plate configured to circulate a fluid. Cells are disposed on the thermal plate. A electronic component is supported by a platform that is spaced apart from the thermal plate. An array of heat pipes are arranged to transfer heat from the electronic component to the thermal plate.

DETAILED DESCRIPTION

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the present invention. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Figure 1:
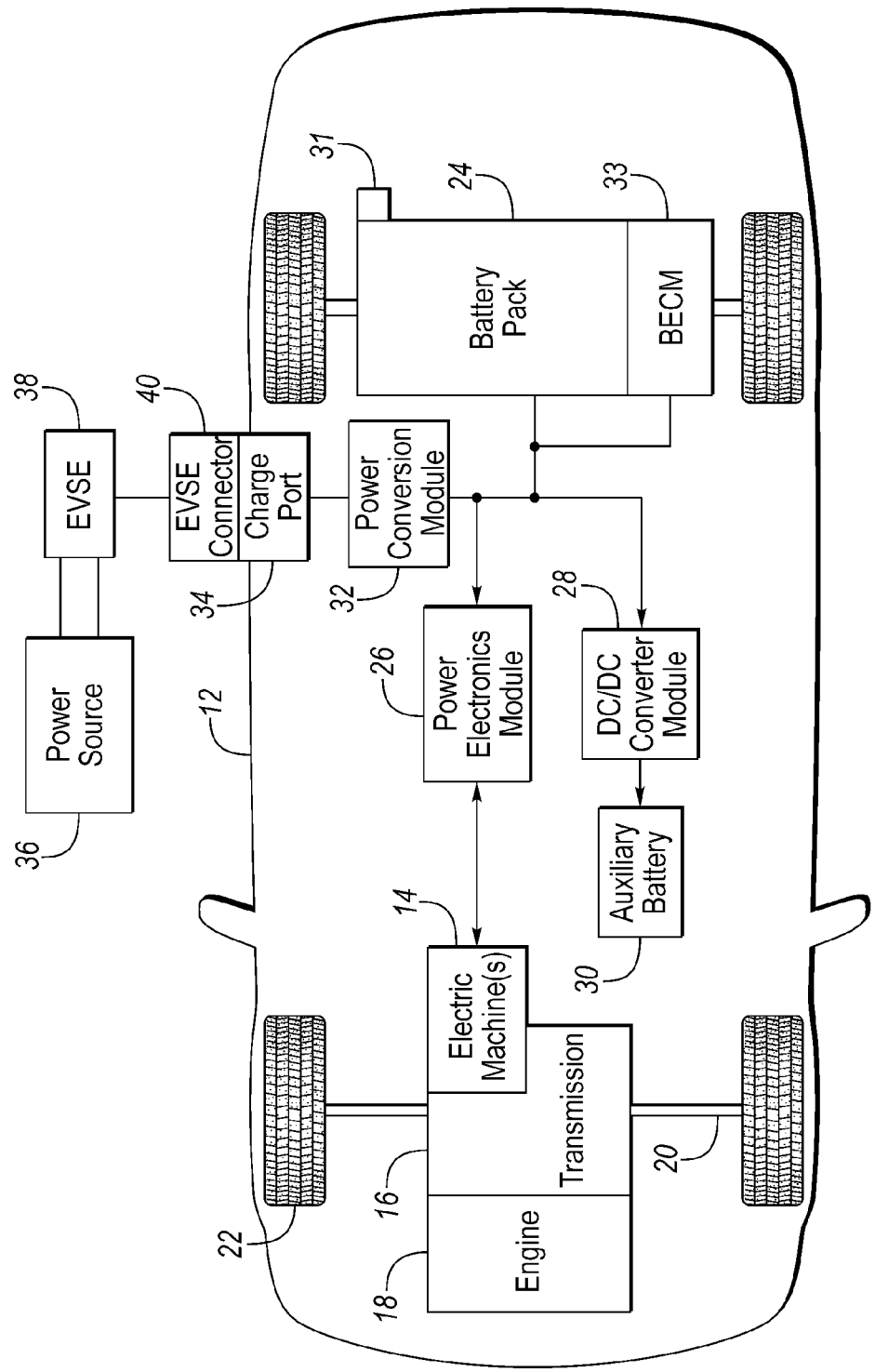
FIG. 1 is a schematic diagram of a typical plug-in hybrid-electric vehicle.

FIG. 1 depicts a schematic of a typical plug-in hybrid-electric vehicle (PHEV). Certain embodiments of this disclosure may be implemented within the context of non-plug-in hybrids and fully electric vehicles. The vehicle 12 includes one or more electric machines 14 mechanically connected to a hybrid transmission 16. The electric machines 14 may be capable of operating as a motor or a generator. In addition, the hybrid transmission 16 may be mechanically connected to an engine 18. The hybrid transmission 16 may also be mechanically connected to a drive shaft 20 that is mechanically connected to the wheels 22. The electric machines 14 can provide propulsion and deceleration capability when the engine 18 is turned on or off. The electric machines 14 also act as generators providing fuel economy benefits by recovering energy through regenerative braking. The electric machines 14 reduce pollutant emissions and increase fuel economy by reducing the work load of the engine 18.

A traction battery or battery pack 24 stores energy used by the electric machines 14. The traction battery 24 typically provides a high voltage direct current (DC) output from one or more battery cell arrays, sometimes referred to as battery cell stacks, within the traction battery 24. The battery cell arrays include one or more battery cells.

The battery cells, such as a prismatic or pouch cell, include electrochemical cells that convert stored chemical energy to electrical energy. The cells include a housing, a positive electrode (cathode) and a negative electrode (anode). An electrolyte allows ions to move between the anode and cathode during discharge, and then return during recharge. Terminals may allow current to flow out of the cell for use by the vehicle. When positioned in an array with multiple battery cells, the terminals of each battery cell may be aligned with opposing terminals (positive and negative) adjacent to one another and a busbar may assist in facilitating a series connection between the multiple battery cells. The battery cells may also be arranged in parallel such that similar terminals (positive and positive or negative and negative) are adjacent to one another.

Different battery pack configurations are available to address individual vehicle variables including packaging constraints and power requirements. The battery cells may be thermally regulated with a thermal management system. Examples of thermal management systems include air cooling systems, liquid cooling systems and a combination of air and liquid systems.

The traction battery 24 may be electrically connected to one or more power electronics modules 26 through one or more contactors (not shown). The one or more contactors isolate the traction battery 24 from other components when opened and connect the traction battery 24 to other components when closed. The power electronics module 26 may be electrically connected to the electric machines 14 and may provide the ability to bi-directionally transfer electrical energy between the traction battery 24 and the electric machines 14. For example, a typical traction battery 24 provides a DC voltage while the electric machines 14 require a three-phase alternating current (AC) voltage to function. The power electronics module 26 may convert the DC voltage to a three-phase AC voltage as required by the electric machines 14. In a regenerative mode, the power electronics module 26 may convert the three-phase AC voltage from the electric machines 14 acting as generators to the DC voltage required by the traction battery 24. The description herein is equally applicable to a pure electric vehicle. In a pure electric vehicle, the hybrid transmission 16 may be a gear box connected to an electric machine 14 and the engine 18 is not present.

In addition to providing energy for propulsion, the traction battery 24 may provide energy for other vehicle electrical systems. A typical system may include a DC/DC converter module 28 that converts the high voltage DC output of the traction battery 24 to a low voltage DC supply that is compatible with other vehicle loads. Other high-voltage loads, such as compressors and electric heaters, may be connected directly to the high-voltage without the use of a DC/DC converter module 28. In a typical vehicle, the low-voltage systems are electrically connected to an auxiliary battery 30 (e.g., a 12 volt battery). The DC/DC converter may also modify the voltage going to the electric machines 14.

A battery electric control module (BECM) 33 may be in communication with the traction battery 24. The BECM 33 may act as a controller for the traction battery 24 and may also include an electronic monitoring system that manages temperature and state of charge for each of the battery cells. The traction battery 24 may have a temperature sensor 31 such as a thermistor or other temperature gauge. The temperature sensor 31 may be in communication with the BECM 33 to provide temperature data regarding the traction battery 24.

The vehicle 12 may be recharged by an external power source 36. The external power source 36 is a connection to an electrical outlet. The external power source 36 may be electrically connected to electric vehicle supply equipment (EVSE) 38. The EVSE 38 may provide circuitry and controls to regulate and manage the transfer of electrical energy between the power source 36 and the vehicle 12. The external power source 36 may provide DC or AC electric power to the EVSE 38. The EVSE 38 may have a charge connector 40 for plugging into a charge port 34 of the vehicle 12. The charge port 34 may be any type of port configured to transfer power from the EVSE 38 to the vehicle 12. The charge port 34 may be electrically connected to a charger or on-board power conversion module 32. The power conversion module 32 may condition the power supplied from the EVSE 38 to provide the proper voltage and current levels to the traction battery 24. The power conversion module 32 may interface with the EVSE 38 to coordinate the delivery of power to the vehicle 12. The EVSE connector 40 may have pins that mate with corresponding recesses of the charge port 34.

The various components discussed may have one or more associated controllers to control and monitor the operation of the components. The controllers may communicate via a serial bus (e.g., Controller Area Network (CAN)) or via dedicated electrical conduits.

Figure 2:
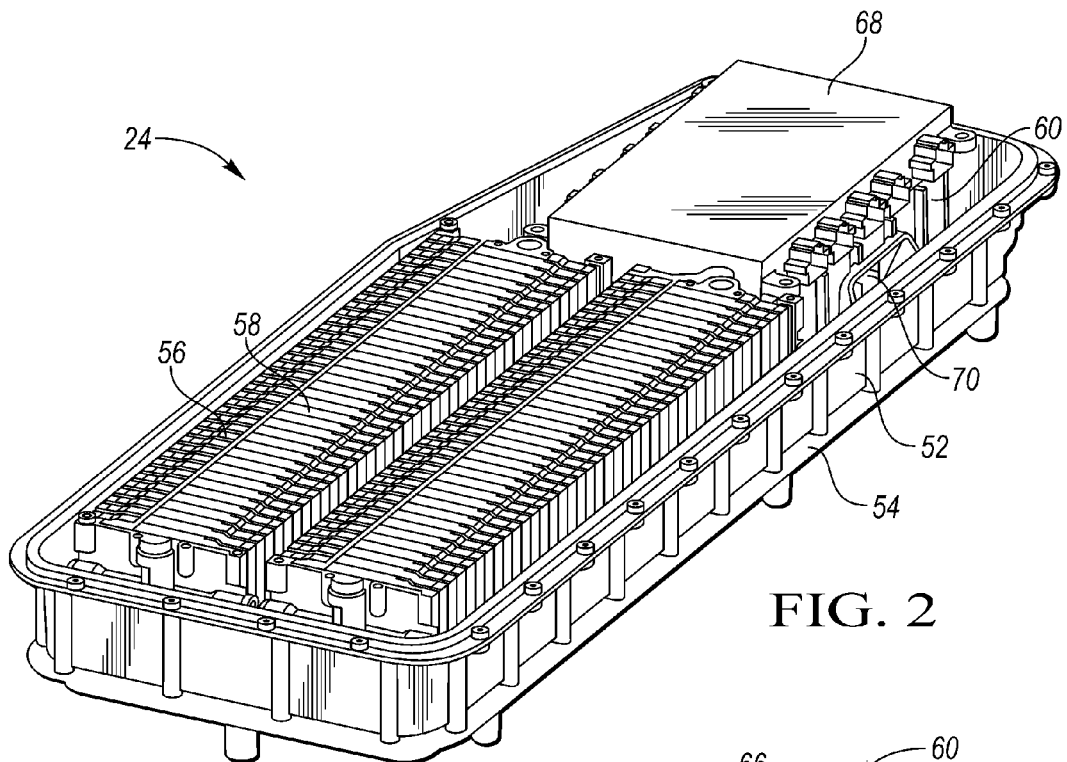
FIG. 2 is a perspective view of a battery assembly.
Figure 3:
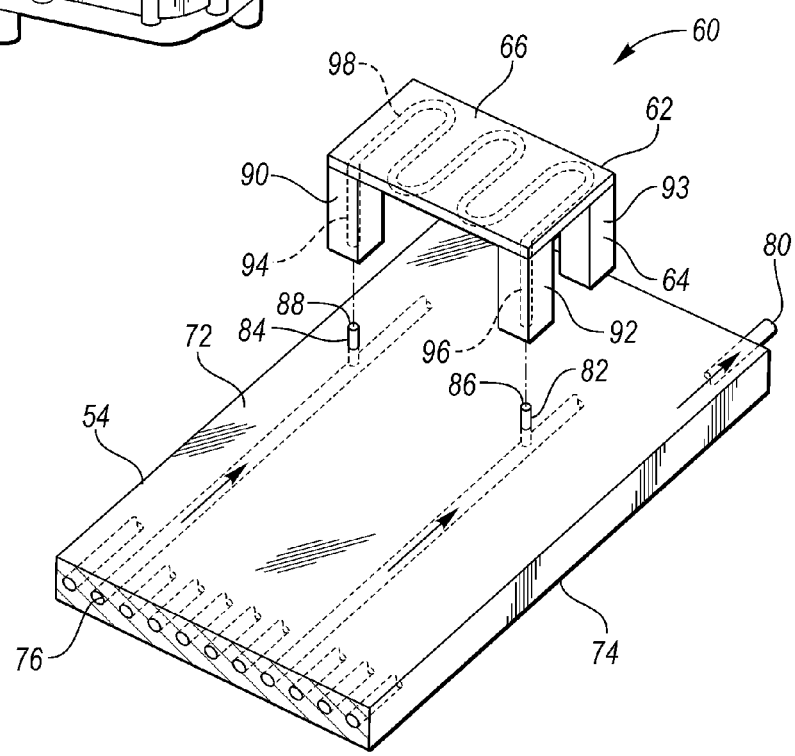
FIG. 3 is an exploded perspective view illustrating a thermal plate and bracket arrangement according to one embodiment of this disclosure.

FIGS. 2 through 8, and the related discussion, describe examples of the traction battery assembly 24. Referring to FIGS. 2 and 3, the traction battery assembly 24 includes a case 52 having a tray (shown) and a cover (not shown). A first thermal plate 54 is disposed along a bottom of the case 52. The first thermal plate 54 is configured to circulate a fluid therein and add or remove heat from the case 52. At least one battery array 56 is disposed on the thermal plate 54. The battery array 56 includes a plurality of battery cells 58 stacked together and electrically connected in series or parallel. The thermal plate 54 is in contact with each of the battery cells 58 and may add or remove heat to the cells depending upon operating conditions. For example, if the cells 58 are above a threshold temperature, a relatively cold fluid is circulated to the first plate 54 to cool the battery cells. Alternatively, if the battery cells 58 are below the threshold temperature, a relatively warm fluid is circulated through the first plate 54 to add heat to the battery cells. The warm fluid may be provided by an internal combustion engine or an electric heater depending upon the vehicle type. A thermal interface material (TIM) may be disposed between the cells 58 and the thermal plate 54. The TIM may be a pad, a gel or a paste.

The traction battery assembly 24 also includes a bracket arrangement 60 having a platform 62, legs 64 and a cooling device 66. The platform 62 may define a planar surface and the legs 64 may extend perpendicularly from the planar surface. The platform 62 is elevated above the first thermal plate 54 via the legs 64. The bracket arrangement 60 may include any number of legs; such as one leg, or four legs as is illustrated. The legs 64 may be connected directly to the thermal plate 54 or may be connected to the case 52. In some embodiments, one or more of the legs 64 is connected to the first thermal plate 54 and one or more of the other legs is connected to the case 52. The cooling device 66 may be attached to the platform 62. Alternatively, the cooling device 66 may be integral with the platform 62 or may be disposed within the platform 62. The cooling device 66 may be an active cooling device or may be passive cooling device. An example active cooling device is a liquid heat exchanger (e.g. a thermal plate) and an example passive cooling system is a heat pipe assembly.

An electronic component 68 may be attached to a first side of the cooling device 66. The electronic component 68 may be a BECM. The cooling device 66 removes excess heat created by the BECM 68. Another electronic component 70 is disposed under the bracket 60 and within a footprint of the bracket 60. The electronic component 70 may be a bus electrical center (BEC), which is electrically connected with the battery arrays 56. The BEC 70 may be disposed on the first thermal plate 54 or may be disposed on a portion of the case 52. One or both of the thermal devices 54, 66 may remove excess heat produced by the BEC 70. In some embodiments, the BEC 70 is in direct contact with a second side of the cooling device 66 that is opposite the BECM 70.

Referring to FIG. 3, the first thermal plate 54 includes a top 72 and a bottom 74. The bottom 74 may be disposed on the case 52 or may define the bottom of the case 52. At least one flow channel or pipe 76 is disposed within the first thermal plate 54 and is configured to circulate a fluid therein. The pipe 76 may be a single pipe that serpentines within the thermal plate 54 or may be a plurality of pipes in a parallel flow arrangement. The thermal plate 54 includes an entrance port (not shown) and an exit port 80 that are connected to a thermal management system. The thermal plate 54 includes an inlet stub 82 extending from the top 72. The inlet stub 82 is connected to a portion of the pipe 76 and defines a port 86. The thermal plate 54 also includes an outlet stub 84 extending from the top 72. The outlet stub 84 is connected to a portion of the pipe 76 and defines a port 88.

The bracket arrangement 60 includes an inlet leg 90, and outlet leg 92 and a pair of other legs 93 connected to the top 72 of the thermal plate 54. The inlet leg 90 defines an inlet channel 94 and the outlet leg 92 defines an outlet channel 96. The inlet and outlet channels 94, 96 form at least a portion of fluid path connecting the flow channels of the first and second thermal plates 54, 66. For example, the second thermal plate 66 includes a single pipe 98 connected to the inlet channel 94 at a first end and connected to the outlet channel 96 at a second end. Alternatively, the second thermal plate 66 includes multiple pipes.

The inlet leg 90 is received on the outlet stub 84 connecting the port 88 and the inlet channel 94 in fluid communication. The outlet leg 92 is received on the inlet stub 82 connecting the port 86 and the outlet channel 96 in fluid communication. In another embodiment, both the inlet and outlet channels are one of the legs.

The first thermal plate 54 and the second thermal plate 66 are in fluid communication with each other via the inlet and outlet legs 90, 92. During operation, a portion of the fluid circulating within pipe 76 of the first thermal plate 54 is diverted into the inlet leg 90 and flows to the second thermal plate 66. The fluid then circulates within the pipe 98 of the second thermal plate 66. The fluid then flows from the second thermal plate 66 to the first thermal plate 58 via the outlet leg 92. Alternatively, the legs 90, 92 include stubs that are received within ports defined in the thermal plate 54 to connect the channels 94, 96 to the pipe 76.

Figure 4:
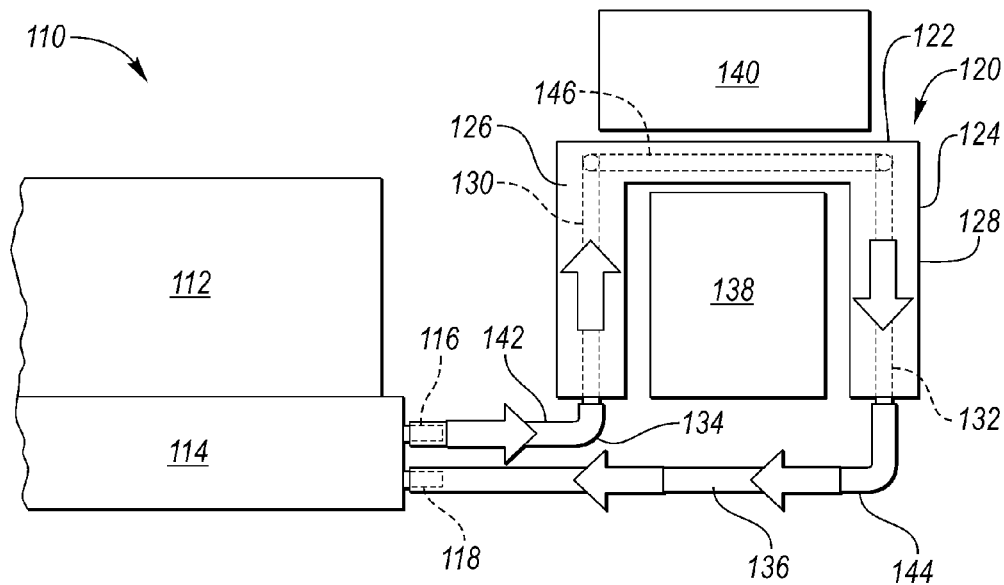
FIG. 4 is a schematic side view illustrating a thermal plate and bracket arrangement according to another embodiment of this disclosure.

Referring to FIG. 4, another traction battery assembly 110 is illustrated. The traction battery assembly 110 includes at least one array 112 disposed on a first thermal plate 114. The first thermal plate 114 may extend along an entirety of the case bottom or may only extend along a portion of the bottom. The first thermal plate 114 may include an outlet stub 116 and an inlet stub 118 extending from a surface of the thermal plate 114. For example, the stubs 116, 118 may extend from a top of the thermal plate or may extend from a side of the thermal plate. The inlet and outlet stubs 116, 118 are fluid communication with the flow channels of the thermal plate 114. The stubs are illustrated in a vertical stack configuration, but the stubs may be arranged side by side in a same horizontal plane.

The battery assembly 110 further includes a bracket arrangement 120 having a second thermal plate 122 and a plurality of legs 124. The thermal plate 122 may be integral with the bracket 120 or may be a separate component that is attached to a platform of the bracket 120. In one embodiment, the thermal plate 114 and the bracket 120 are arranged adjacent to one another, rather than on top of one another (as illustrated in FIG. 3). In the illustrated embodiment, the legs 124 of the bracket 120 are attached to the case.

One of the legs 124 is an inlet leg 126 defining at least a portion of a fluid path 142 connecting the flow channels of the first and second plates 114, 122. The fluid path 142 may include an inlet channel 130 defined in the inlet leg 126 and a supply line 134 connected between the inlet channel 130 and the outlet stub 116. Alternatively, the fluid path 142 may be a single line directly connected between the first and second thermal plates 114, 116. The single line may be received with a hole extending through a length of the leg 126.

Another of the legs 124 is an outlet leg 128 defining at least a portion of a fluid path 144 connecting the flow channels of the first and second plates 114, 122. The fluid path 144 may include an outlet channel 132 defined in the outlet leg 128 and a return line 136 connected between the outlet channel 132 and the inlet stub 118. Alternatively, the fluid path 144 may be a single line directly connected between the first and second thermal plates 114, 122. The single line may be received with a hole extending through a length of the leg 128. In an alternative embodiment, the return line 136 connects to the thermal management system and does not connect to the first thermal plate 114.

The second thermal plate 122 may include at least one pipe 146 connected to the inlet channel 130 at a first end and connected to the outlet channel 132 at a second end. A portion of the fluid circulating within the first thermal plate 114 is diverted to the second thermal plate 122 via the supply line 134. The fluid then circulates within the second thermal plate 122 and returns to the first thermal plate 114 via the return line 136. An electronic component 140, such as a BECM, is disposed on the bracket arrangement 120 and is thermally regulated by the second thermal plate 122. Another electronic component 138, such as a BEC, is disposed under the bracket arrangement 120.

Figure 5:
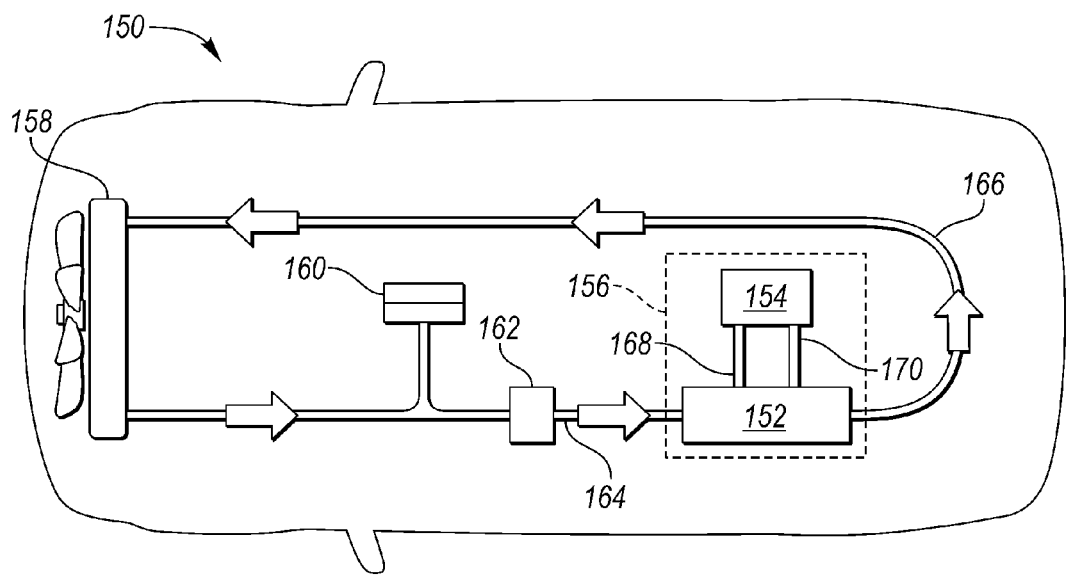
FIG. 5 is a schematic diagram of a thermal management system according to one embodiment of this disclosure.

Referring to FIG. 5, a liquid thermal management system 150 includes a first thermal plate 152 and a second thermal plate 154. The thermal plates are disposed within the traction battery assembly 156. The system 150 also includes a radiator 158, a reservoir 160 and a pump 162 interconnected with a plurality of lines and valves. The thermal management system 150 may be a dedicated system or may be plumbed into an existing engine cooling system. Fluid is supplied to the first thermal plate 152 via a supply line 164. The fluid then circulates within one or more first flow channels of the first thermal plate 152 and exits the first thermal plate into a return line 166 connected to the radiator 158. A portion of the fluid within the first flow channels is diverted to one or more second flow channels within the second thermal plate 154 via line 168. After circulating through the second flow channels, the fluid returns to the first flow channels via line 170.

Figure 6:
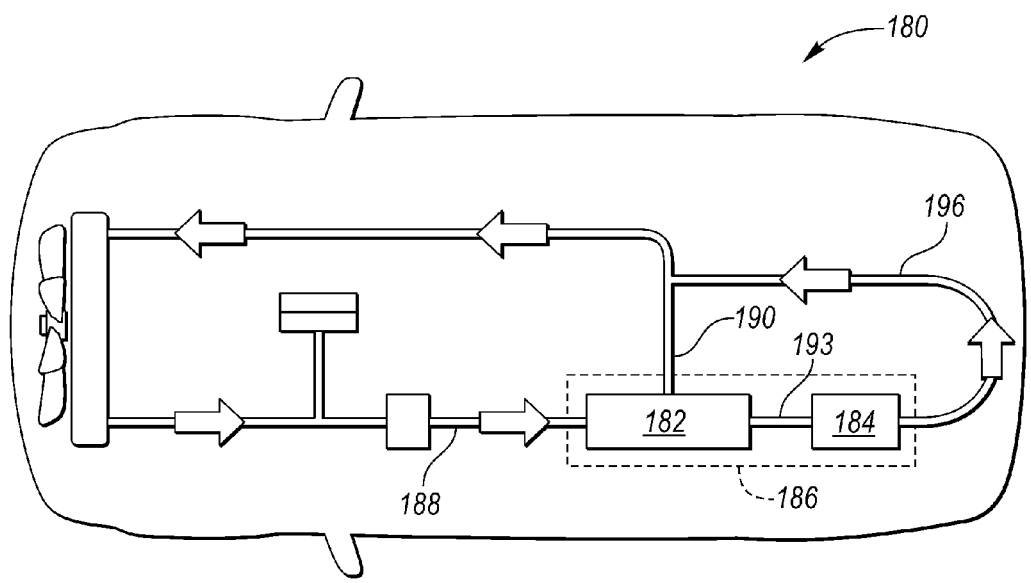
FIG. 6 is a schematic diagram of a thermal management system according to another embodiment of this disclosure.

Referring to FIG. 6, another thermal management system 180 includes a first thermal plate 182 and a second thermal plate 184 disposed within the traction battery assembly 186. The system 180 is similar to system 150 except fluid from the second thermal plate 184 does not return to the first thermal plate 182. Fluid is supplied to the first thermal plate 182 via a supply line 188. The fluid then circulates within first flow channels of the thermal plate 182 and exits the thermal plate 182 into a return line 190. A portion of the fluid within the first flow channels is diverted to a second flow channel within the second thermal plate 184 via line 193. After circulating through the second flow channels, the fluid exits into the return line 190 via line 196.

Figure 7:
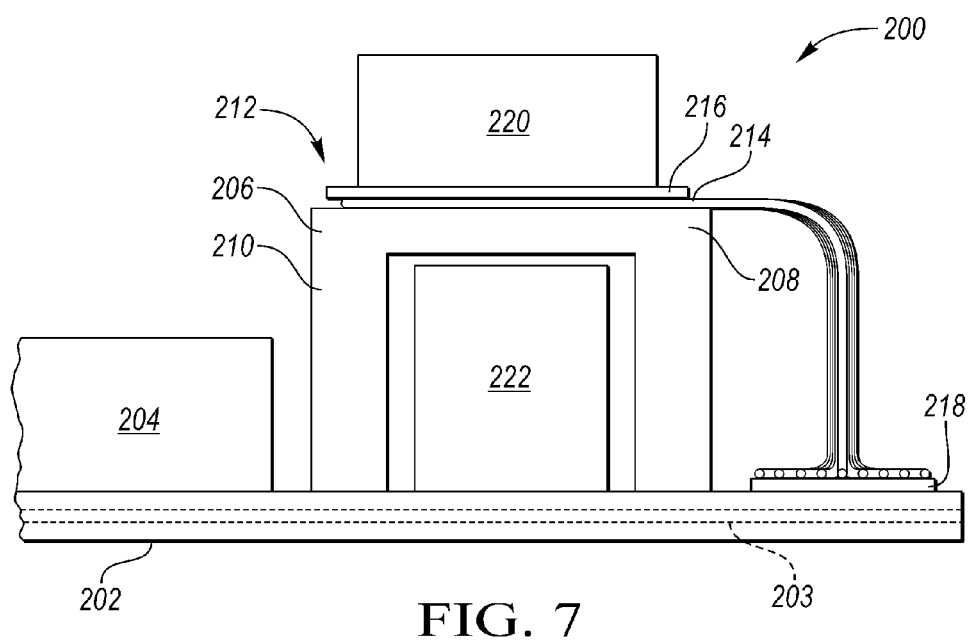
FIG. 7 is a side view of a portion of another battery assembly having a passive cooling device.
Figure 8:
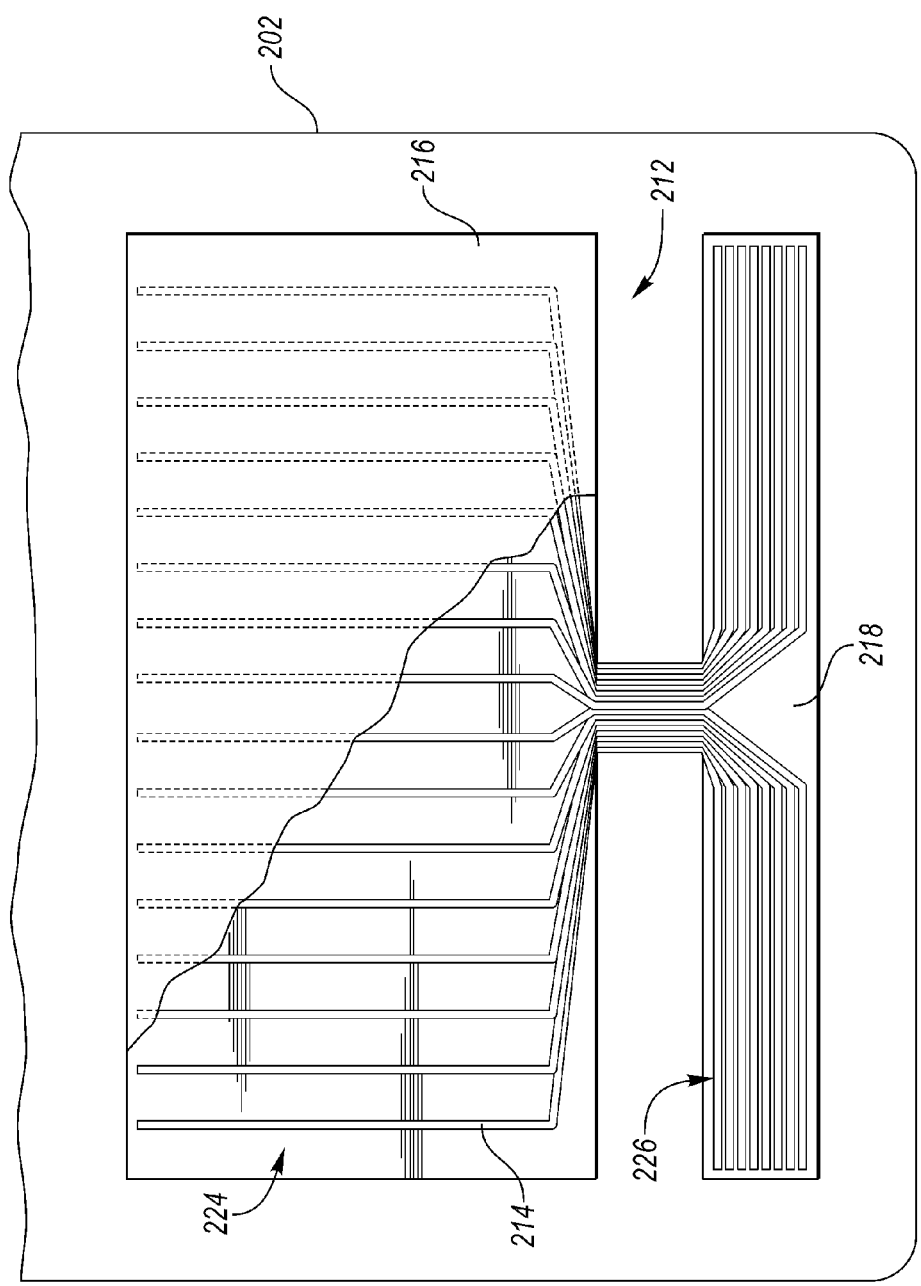
FIG. 8 is a top view of the battery assembly of FIG. 7 illustrating the passive cooling device.

Referring to FIGS. 7 and 8, a traction battery assembly 200 includes a thermal plate 202 disposed within a case. The thermal plate 202 includes pipes 203 for circulating a fluid medium within the thermal plate 202. At least one battery array 204 is disposed on the thermal plate 202 for heating or cooling the array. A bracket 206 is disposed within the case. The bracket includes a platform 208 spaced apart from the thermal plate 202 and a plurality of legs 210 connected to the platform 208. The base of the legs 210 may connect to the thermal plate 202 or the case or both. A first electronic component 220 is supported by the platform 208. A second electronic component 222 is disposed under the platform 208. A passive cooling device 212 is disposed within the case for cooling at least the first component 220. The passive cooling device 212 extends between the platform 208 and the thermal plate 202 to transfer heat from the component 222 to the thermal plate 202. The passive cooling device 212 may be disposed on top of the platform 208 or may be integral with the platform 208. The passive cooling device 212 may include an array of heat pipes 214 arranged in parallel. Each of the heat pipes 214 includes a first section 224 extending across at least a portion of the platform 208 and a second section 226 extending across at least a portion of the thermal plate 202. An intermediate section connects between the first and second sections 224, 226. The intermediate section may be exposed (as illustrated) or may be encased in a housing. A first heat spreader 216 may be connected to the array of heat pipes 214 at the first section 224 to facilitate heat transfer between the component 220 and the heat pipes 214. The heat spreader 216 may be a metallic plate such as copper, aluminum or other thermally conductive material. Alternatively, the heat spreader 216 may be a pair of plates, or a housing, that sandwich the heat pipes 214. The passive cooling device 212 may be arranged such that the electric component 220 is in contact with the heat spreader 216 on a side opposite the heat pipes 214. The heat pipes 214 conduct heat from the first component 220 and carry it to the thermal plate 202 for removal from the case.

A second heat spreader 218 may attached to the heat pipes 214 at the second section 226. The heat spreader 218 may be a single plate, a double plate, or a housing (as described above) and may be made of copper, aluminum or other thermally conductive material. A first side of the heat spreader 218 may be attached to the thermal plate 202 and a second side of the spreader may be attached to the heat pipes 214. The heat spreader 218 helps conduct thermal energy from the heat pipes 214 to the thermal plate 202.

In another embodiment, the intermediate portions of heat pipes 214 may extend through the bracket 206 as opposed to being off to the side as illustrated in FIG. 7. The intermediate portions may extend through one or more of the legs similar to the fluid lines described in the active cooling system. The heat spreader 218 may be disposed between a leg 210 of the bracket 206 and the thermal plate 202. Alternatively, one or more of the legs 210 may include a thick or expanded lower end that acts like a heat spreader.

In another embodiment, the intermediate portion of the heat pipes 214 may be attached to an outside surface of the bracket 206. In this configuration, one or more of the legs 210 provides support and shields the heat pipes 214 from being hit or damaged.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and can be desirable for particular applications.

What is claimed is:

1. A traction battery comprising:
a first thermal plate disposed within a case;
cells disposed on the first thermal plate;
a bracket arrangement disposed within the case and including
a second thermal plate spaced apart from the first thermal plate, and
a leg defining at least a portion of a fluid path connecting flow channels of the first and second thermal plates; and
an electronic component disposed on the second thermal plate.

2. The traction battery of claim 1 wherein the leg further defines at least a portion of an additional fluid path connecting flow channels of the first and second thermal plates, and wherein the fluid path is an inlet path connected to the first thermal plate and configured to supply fluid from the first thermal plate to the second thermal plate, and the additional fluid path is an outlet path connected to the second thermal plate and configured to return fluid from the second thermal plate to the first thermal plate.

3. The traction battery of claim 1 wherein the bracket arrangement further includes an additional leg defining at least a portion of an additional fluid path connecting the flow channels of the first and second thermal plates.

4. The traction battery of claim 3 wherein the flow channel of the second thermal plate further includes a first end connected to the fluid path and a second end connected to the additional fluid path.

5. The traction battery of claim 1 wherein the bracket arrangement further includes an additional leg defining at least a portion of an additional fluid path connecting the flow channel of the second thermal plate to a return line of a fluid circulation system.

6. The traction battery of claim 1 further comprising an additional electronic component disposed within a footprint of the bracket, wherein the second thermal plate further includes a first side facing the electronic component and a second side facing the additional electronic component.

7. The traction battery of claim 1 wherein the leg is attached to the first thermal plate.

8. The traction battery of claim 1 wherein the bracket arrangement has four legs each being connected to the first thermal plate at a first end and connected to the second thermal plate at a second end.

9. The traction battery of claim 1 wherein the at least a portion of the fluid path further includes a channel extending through a length of the leg.

10. A traction battery comprising:
a first thermal plate disposed within a case;
cells disposed on the first plate;
a second thermal plate spaced apart from the first plate;
a bracket supporting the second plate and including a leg between the first and second plates, the leg defining at least a portion of a fluid path connecting flow channels of the first and second thermal plates; and an electronic component disposed against the second thermal plate.

11. The traction battery of claim 10 wherein the second thermal plate is integral with the bracket.

12. The traction battery of claim 10 wherein the leg is attached to the first thermal plate.

13. The traction battery of claim 10 wherein the leg further includes an internal channel extending through a length of the leg, the internal channel being a portion of the fluid path.

14. The traction battery of claim 13 wherein the channel couples to a port defined in the first thermal plate.

15. A traction battery comprising:
a case including a thermal plate configured to circulate a fluid;
cells disposed on the thermal plate;
a platform spaced apart from the thermal plate;
an electronic component supported by the platform; and
an array of heat pipes arranged to transfer heat from the electronic component to the thermal plate.

16. The traction battery of claim 15 wherein each of the heat pipes further includes a first section extending across at least a portion of the platform and a second section extending across at least a portion of the thermal plate.

17. The traction battery of claim 16 further comprising a heat spreader, wherein each of the heat pipes is connected to the heat spreader at the first section.

18. The traction battery of claim 17 wherein the electronic component is attached to the heat spreader.

19. The traction battery of claim 17 further comprising an additional heat spreader connected to the heat pipes at the second section, wherein the additional heat spreader is connected to the thermal plate.

20. The traction battery of claim 15 wherein the array of heat pipes is attached to the platform.

* * * * *